United States Patent [19]

Gautier

[11] Patent Number: 4,777,865

[45] Date of Patent: Oct. 18, 1988

[54] BRAKE BOOSTER

[75] Inventor: Jean-Pierre Gautier, Aulnay-sous-Bois, France

[73] Assignee: Bendix France, Drancy, France

[21] Appl. No.: 907,431

[22] Filed: Sep. 12, 1986

[30] Foreign Application Priority Data

Sep. 30, 1985 [FR] France ............................. 85 14454

[51] Int. Cl.⁴ ............................................. F15B 9/10
[52] U.S. Cl. ................................. 91/369.2; 91/376 R
[58] Field of Search ............ 91/369 A, 369 R, 369 B, 91/369 C, 367 R

[56] References Cited

U.S. PATENT DOCUMENTS 4,535,591  8/1985  Kobayashi ................. 91/369 A X
4,630,525 12/1986  Nishii ............................ 91/369 A
4,641,568  2/1987  Boehn et al. ................... 91/369 A Primary Examiner—A. Michael Chambers
Assistant Examiner—John C. Fox
Attorney, Agent, or Firm—Larry J. Palguta; Ken C. Decker

[57] ABSTRACT

The valve member (5) of the distribution valve mechanism of the booster comprises an active part (19), cooperating selectively with the valve seats (18; 17) in the hub (8) of the piston (2) and on the valve plunger (13), and an axial undulated tubular part (24) mounted, by its rear end, on an internal end (26) of a valve-member support (27) forming bearing zones (282; 281) for a spring (31) causing the return movement of the input rod (14) and for a spring (30) biasing the valve member and mounted, by its external periphery (29), in the tubular hub (8).

1 Claim, 1 Drawing Sheet

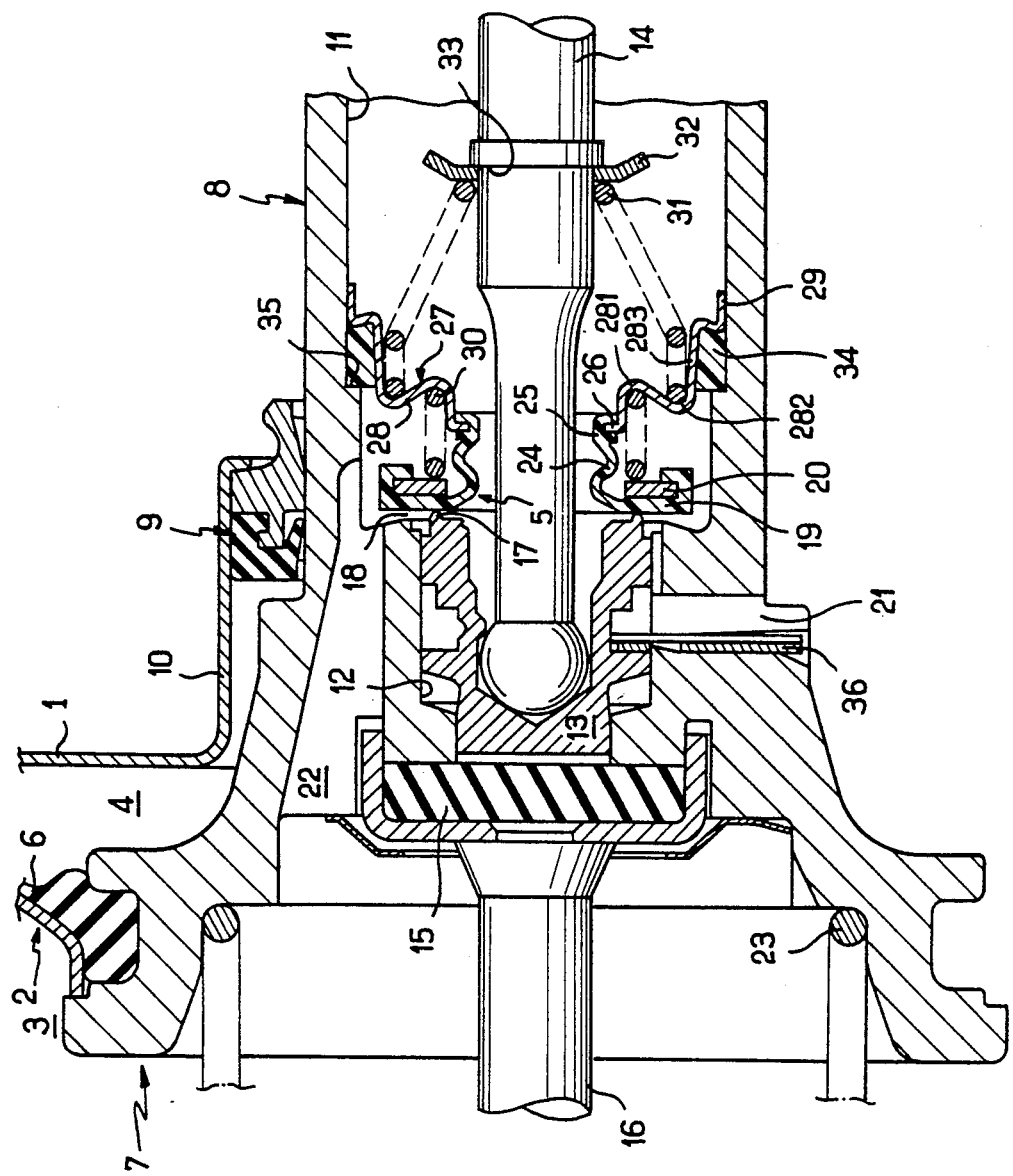

BRAKE BOOSTER

The present invention relates to brake boosters, typically of the vacuum type, comprising, inside a housing, a piston assembly having a tubular hub enclosing a valve distribution means comprising an annular resilient valve member having an active part capable of cooperating selectively with a first valve seat and a second valve seat which are concentric and are formed, respectively, in the hub and by a valve plunger slideable inside the hub and coupled to an input rod of the booster, the valve member being mounted in the hub by means of a support arranged in the hub and forming a first external bearing zone for a return spring causing the return movement of the input rod and a second internal bearing zone for a valve spring biasing the active part of the valve member towards the first and second valve seats.

A booster of this type is described in FR-A No. 1,512,696, the contents of which are assumed to be incorporated herein for reference. In this document, as in the case of most of the existing boosters, the annular valve member has a general tulip shape with an external flange for mounting it, together with the valve-member support, in the tubular hub of the piston assembly, the active part of the valve member being connected to this mounting flange by an integral thin web which widens outwards for connection to the mounting flange. In such an arrangement, the intermediate web portion of the valve member is subjected, during the serviceable life of the booster, to very many flexural and compressive stresses which, in the long term, may cause embrittlement, at this point, of the elastomer material forming the valve member. In addition, during operation, this intermediate web part of the valve member is subjected to a pressure differential between the atmosphere permanently prevailing inside the tubular hub, around the input rod, and the vacuum permanently prevailing inside the annular chamber surrounding this intermediate covering part of the valve member and connected permanently to the front chamber, or vacuum chamber, of the booster. This pressure differential, in addition to contributing to the fatigue of the intermediate web part, gives rise, on the active part of the valve member, to an axial force which is added to the force of the valve spring and which the valve plunger must overcome each time the brake is released, in order to disengage the active part of the valve member from the first valve seat formed in the hub and reestablish communication between the rear working chamber of the booster and the vacuum chamber, thereby requiring over-dimensioning of the input-rod return spring, leading, in particular, to a loss in "pedal sensitivity" when the booster is operated.

It is therefore an object of the present invention to provide a brake booster of the type defined above, which has a simple and robust design and low manufacturing costs and which has a longer life with regard to the valve member and allows the force of the input-rod return spring to be reduced, thereby resulting in increased sensitivity during operation.

In order to achieve this, according to a feature of the invention, the valve member has an axial undulated tubular part mounted, by its end opposite to the active part, on an internal end portion of the support which is advantageously made of sheet metal and mounted typically, by its external periphery, in the tubular hub with the interposition of an annular seal.

With such an arrangement, the valve member exposes, to the pressure differential an effective area capable of giving rise to an extremely small axial force, thus overcoming the abovementioned drawbacks, the axial undulated tubular part being better suited to withstand the compressive and tensile movements than the flared intermediate web part of the valve members of the prior art, consequently making it possible to reduce the overall manufacturing costs of the valve member.

The invention will now be described by way of example with reference to the accompanying drawings in which:

The sole FIG. 1 is a partial longitudinal section of the rear central part of a brake booster according to the invention.

The brake booster according to the invention comprises, conventionally, a housing consisting of two peripherally assembled housing shells, the central part of the rear shell 1 being visible in the Figure, inside which housing a piston assembly, indicated generally by the reference number 2, is arranged, said piston assembly dividing the interior of the housing into a front chamber 3, or vacuum chamber, intended to be permanently connected to a vacuum source of a motor vehicle, for example the inlet manifold of the engine of this vehicle (not shown), and a rear chamber or working chamber 4 capable of being connected selectively either to the front chamber 3 or to the atmosphere via a valve means having a resilient valve member indicated generally by the reference number 5, as will be seen below. The piston assembly 2 consists of a movable-wall structure with a membrane 6 and of a hub, indicated generally by the reference number 7, comprising a rear tubular hub part 8 sealingly slidably mounted, with the interposition of an assembly 9 consisting of a guiding ring and of a sliding seal, in a rear central tubular portion 10 of the rear wall 1 of the housing. The tubular hub part 8 is formed with an internal stepped recess 11 communicating permanently, at the rear, with the atmosphere and connected, at the front, to a central bore 12 inside which there is slidably mounted a valve plunger 13 coupled to a booster input rod 14 intended to be connected to a brake pedal (not shown) of the vehicle and extending axially centrally inside the stepped recess 11. The hub 7 also supports, with the interposition of an elastic reaction disc 15 with which the valve plunger 13 is capable of cooperating in compressive engagement, a booster output rod 16 intended to be coupled to a piston of a master cylinder (not shown) associated with the booster.

The rear end of the valve plunger 13 forms a central annular valve seat 17, the zone connecting the stepped recess 11 and the bore 12 forming another annular valve seat 18 surrounding the preceding one and concentric therewith. The valve member 5 has a front annular active part 19 of general radial extension, typically strengthened by a metal annular plate 20, intended to co-operate selectively with the valve seats 17 and 18 so as to connect the rear working chamber 4, via an air passage 21 formed radially in the hub 7 and communicating with the bore 12, to the atmosphere prevailing inside the stepped recess 11, at the rear of the valve member 5, or to the front vacuum chamber 3, via air passages 22 formed axially inside the hub 7 and opening in the front end of the stepped recess 11 around the valve seat 18 and the active part 19 of the valve member 5. In the rest position, shown in the Figure, the piston assembly 2 is positioned in the vicinity of the rear shell 1 by a piston return spring 23.

According to the invention, the radially internal end of the active part 19 of the valve member 5 is extended towards the rear by an axial undulated tubular part 24 integral with the elastomer material of the active part 19 and ending, at the rear, in a mounting bead 25 engaged over an internal end lug 26, folded radially inwards, of a valve-member support indicated generally by the reference number 27. This valve-member support 27, which is made advantageously of sheet metal, has, commencing from its internal end 26, an S-shaped middle part 28 extended, in turn, radially outwards by an external mounting part having an external tubular zone 29 engaged inside the rear bore of larger diameter of the stepped recess 11. The internal rounded bend 281 of the middle part 28 forms a bearing zone for a helical valve spring 30 biasing axially the active part 19 of the valve member 5 in the direction towards the valve seats 17 and 18. The external rounded bend 282 of the middle part 28 forms a bearing zone for a rod return spring 31 bearing also centrally against a collar 32 mounted on the input rod 14 and co-operating with a shoulder 33 of the latter.

In the embodiment shown, the annular valve-member support 27, consisting of a continuous non-perforated sheet-metal web, is mounted in position inside the stepped recess 11 with the interposition of an annular seal 34 bearing against a shoulder 35, extending radially inwards, of the stepped recess 11 and the compressed radially between the internal wall of the stepped recess 11 and the external wall of the axial external arm of the S of the middle part 28 which is connected to the external end part 29. Alternatively, this end part 29, or the external arm 283 of the S of the middle part 28, may extend axially towards the rear as far as the rear end of the tubular hub part 8, was to bear against the rear front end of the latter in conjunction with the rear end flange of the protection bellows usually provided around the rear hub part 8 and engaging over the guiding ring of the guiding and sealing assembly 9. The piston hub 7 has, in addition, advantageously a stop key 36 mounted inside the radial-air passage 21 and projecting into the bore 12 so as to cooperate with a peripheral shoulder of the valve plunger 13 in order to limit the relative backwards movement of the latter inside the bore 12.

Also alternatively, the collar 32 may be slidably mounted on the input rod 14 and co-operate externally, in abutment, with a stop member integral with the rear shell 1, as described in the document EP-A No. 0,158,552.

I claim:

1. A brake booster comprising, inside a housing a piston assembly having a tubular hub enclosing distribution valve means comprising an annular resilient valve member having an active part that cooperates selectively with a first valve seat and a second valve seat which are concentric and are formed, respectively, in the hub and by a valve plunger sliding inside the hub and coupled to an input rod of the booster, said valve member being mounted in the hub by means of a support arranged in the hub, the support forming a first bearing zone for a return spring which causes return movement of said input rod and a second bearing zone for a valve spring biasing said active part of said valve member toward said first and second valve seats, characterized in that said valve member has an axial undulated tubular part mounted, by an end opposite said active part, on an internal end portion of said support, said active part of said valve member extending radially outwardly from said axial undulated tubular part, said support mounted by an external peripheral portion in said tubular hub with a sealing ring disposed between the peripheral portion and the hub, the sealing ring separate from the valve member, said support having an S-shaped middle part with rounded bends of the S-shaped middle part forming said first and second bearing zones, said support made of steel sheet, and the external peripheral portion comprising a second S-shaped part at a radially outer end thereof and integral with the middle part, the second S-shaped part forming an axial abutment surface for said sealing ring which is captured axially between the abutment surface and a shoulder of the hub.

* * * * *